(12) United States Patent
He et al.

(10) Patent No.: US 9,300,520 B2
(45) Date of Patent: Mar. 29, 2016

(54) MOBILE NETWORK APPLICATION TEST

(71) Applicant: International Business Machines Corporation, Armonk, NY (US)

(72) Inventors: Gu Yi He, Shanghai (CN); Wei Huang, Shanghai (CN); Yang Liu, Shanghai (CN); Si Qi Zhong, Shanghai (CN); Deng Peng Zhou, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 448 days.

(21) Appl. No.: 13/907,193

(22) Filed: May 31, 2013

(65) Prior Publication Data

US 2013/0326074 A1    Dec. 5, 2013

(30) Foreign Application Priority Data

May 31, 2012    (CN) .......................... 2012 1 0177863

(51) Int. Cl.
 G06F 11/36    (2006.01)
 H04L 29/08    (2006.01)
(52) U.S. Cl.
 CPC .......... *H04L 29/08594* (2013.01); *G06F 11/36* (2013.01); *G06F 11/3664* (2013.01); *G06F 11/3668* (2013.01); *G06F 11/3672* (2013.01);
 (Continued)
(58) Field of Classification Search
 CPC ..... G06F 11/263; G06F 11/3013; G06F 8/24; G06F 11/36; G06F 11/3664; G06F 11/3668; G06F 11/3672; G06F 11/3688; G06Q 10/0637; G06Q 40/08; H04L 43/0876; H04L 63/08; H04L 67/02; H04L 29/08594; H04L 29/0809; H04M 1/24; H04W 48/18
 See application file for complete search history.

(56) References Cited

U.S. PATENT DOCUMENTS

2002/0095436 A1    7/2002    Lee
2006/0073785 A1    4/2006    Klassen et al.
(Continued)

FOREIGN PATENT DOCUMENTS

| CN | 101135989 A | 3/2008 |
|---|---|---|
| CN | 101521899 A | 9/2009 |
| CN | 101576843 A | 11/2009 |

OTHER PUBLICATIONS

Murugasan, S. and Balasubramanian, A., "Addressing the Challenges of Web Applications on Mobile Handheld Devices", Proceedings of the International Conference on Mobile Business (ICMB '05), 2005, http://ieeexplore.ieee.org/stamp/stamp.jsp?arnumber=1493609, 7 pages.

(Continued)

*Primary Examiner* — Le H Luu
(74) *Attorney, Agent, or Firm* — Cantor Colburn LLP

(57) ABSTRACT

Embodiments relate to a method, system, and computer program product for testing a mobile network application. An aspect includes a method that receives a test request for a mobile network application and activating a test session window on a browser of a mobile device according to the test request. The method also includes obtaining a request in hypertext markup language (HTTP) that corresponds to the test request such that the HTTP request contains session information for the test session window and sending the HTTP request to the mobile network application. An HTTP response containing session information is then received from the mobile network application.

19 Claims, 4 Drawing Sheets

(52) U.S. Cl.
CPC ........ G06F 11/3688 (2013.01); H04L 29/0809 (2013.01); H04L 67/02 (2013.01); H04L 67/142 (2013.01)

(56) References Cited

U.S. PATENT DOCUMENTS

| | | | |
|---|---|---|---|
| 2006/0174162 A1* | 8/2006 | Varadarajan | G06F 11/263 714/38.14 |
| 2006/0205397 A1* | 9/2006 | So | H04M 1/24 455/423 |
| 2007/0067373 A1* | 3/2007 | Higgins | G06F 11/3013 |
| 2007/0282858 A1* | 12/2007 | Arner | H04L 67/02 |
| 2008/0127097 A1 | 5/2008 | Zhao et al. | |
| 2008/0313282 A1* | 12/2008 | Warila | G06F 8/24 709/206 |
| 2009/0013310 A1 | 1/2009 | Arner et al. | |
| 2009/0138427 A1* | 5/2009 | Kalavade | G06Q 10/0637 |
| 2010/0146488 A1 | 6/2010 | Chen et al. | |
| 2010/0223471 A1* | 9/2010 | Fresko | H04L 63/08 713/176 |
| 2010/0279733 A1* | 11/2010 | Karsten | H04W 48/18 455/552.1 |
| 2010/0333088 A1 | 12/2010 | Rogel et al. | |
| 2011/0028145 A1 | 2/2011 | Marsyla et al. | |
| 2011/0078663 A1 | 3/2011 | Huang et al. | |
| 2011/0161484 A1* | 6/2011 | Van den Bogaert | H04L 43/0876 709/224 |
| 2011/0161912 A1 | 6/2011 | Eteminan et al. | |
| 2012/0029947 A1* | 2/2012 | Wooldridge | G06Q 40/08 705/4 |

OTHER PUBLICATIONS

"User Experience Testing for Mobile Web", Disclosure No. IPCOM000195847D dated May 19, 2010, http://ip.com/IPCOM/000195847, 2 pages.

Zhou Xiangyun et al., "Automatic Testing Framework for Internet Applications", 2011 IEEE 3rd International Conference on Issue Date: May 27-29, 2011, http://ieeexplore.ieee.org/xpl/freeabs_all.jsp?arnumber=6014212, pp. 35-37.

* cited by examiner

MOBILE NETWORK APPLICATION TEST

PRIORITY

The present application claims priority to Chinese application number 201210177863.7 filed May 31, 2012 and all benefits accruing therefrom under U.S.C. §119, the contents of which is incorporated herein in its entirety.

BACKGROUND

The present disclosure relates generally to mobile networks and more particularly to a mobile network application test.

With the advent of technology and the popularity of mobile communication, mobile devices are changing the way information is being accessed. To keep up with demand, a network application needs to have superior performance for communication with a personal computer and a browser associated with a mobile device. Consequently, it may be necessary to conduct a large number of tests on a mobile network application in order to ensure the integrity and performance of the mobile network application as relating to various mobile devices.

A traditional test conducted on a mobile network application usually involves first the developing and testing of an application on a desktop computer by using a simulator that replicates a mobile device. A next step would be to test the application on a real mobile device and solving any problems that may be detected. The two delineated steps are then repeated as necessary.

For most mobile network applications, a large number of test cases are usually required to cover various scenarios that can ensue on a mobile device. However, using a real mobile device to complete the testing of these scenarios requires considerable time and can be resource intensive and expensive.

SUMMARY

Embodiments include a method, system, and computer program product for testing a mobile network application. The method includes receiving a test request for a mobile network application and activating a test session window on a browser of a mobile device according to the test request. The method also includes obtaining a request in hypertext transfer protocol (HTTP) that corresponds to the test request such that the HTTP request contains session information for the test session window and sending the HTTP request to the mobile network application. An HTTP response containing session information is then received from the mobile network application.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Some of the embodiments described herein will be described in more detail with reference to the accompanying figures. However, the present disclosure can be implemented in various manners, and thus should not be construed to be limited to the embodiments disclosed herein. On the contrary, those embodiments are provided to provide better understanding of the present disclosure.

Figure 1:
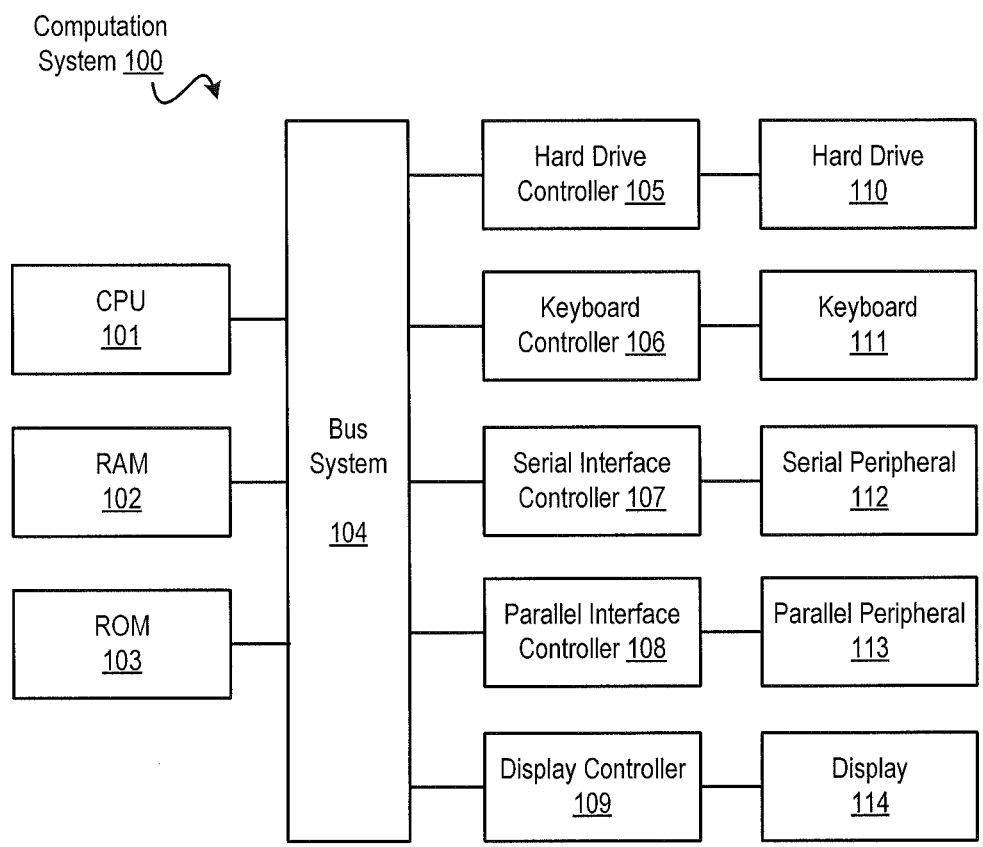
FIG. 1 depicts an exemplary computer system in accordance to one embodiment.

FIG. 1 is an illustration of an exemplary computer system 100 used to implement an embodiment according to the present invention. As shown in FIG. 1, the computer system 100 may include a central process unit (CPU) 101, a random access memory (RAM) 102, a read only memory (ROM) 103, system bus 104, hard drive controller 105, keyboard controller 106, serial interface controller 107, parallel interface controller 108, display controller 109, hard drive 110, keyboard 111, serial peripheral equipment 112, parallel peripheral equipment 113 and display 114. Among above devices, CPU 101, RAM 102, ROM 103, hard drive controller 105, keyboard controller 106, serial interface controller 107, parallel interface controller 108 and display controller 109 are coupled to the system bus 104. Hard drive 110 is coupled to hard drive controller 105. Keyboard 111 is coupled to keyboard controller 106. Serial peripheral equipment 112 is coupled to serial interface controller 107. Parallel peripheral equipment 113 is coupled to parallel interface controller 108. And, display 114 is coupled to display controller 109. It should be understood that the structure as shown in FIG. 1 is only for the exemplary purpose rather than any limitation to the present invention. In some cases, some devices may be added to or removed from the computer system 100 based on specific situations.

As can be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference to the figures, descriptions will be presented below to a method and system for testing a mobile network application according to the embodiments of the present invention.

Figure 2:
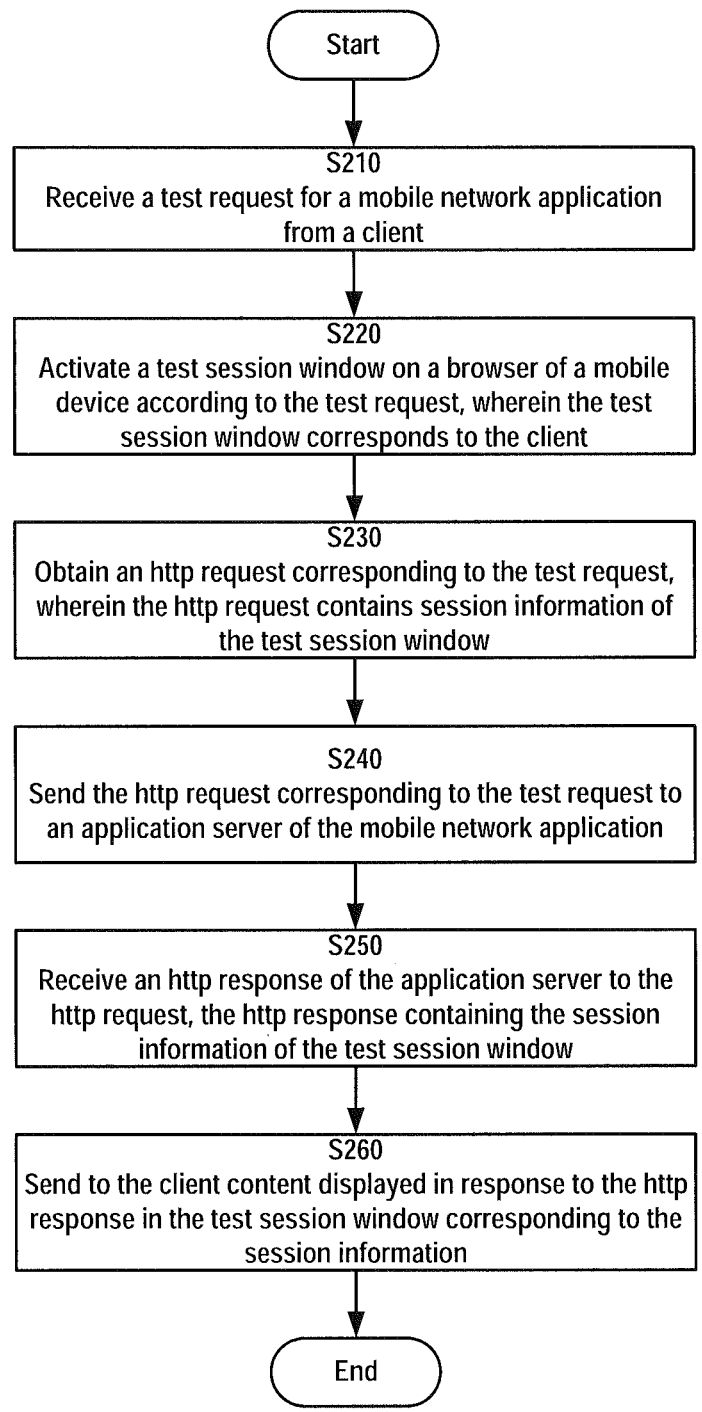
FIG. 2 is a flowchart illustration depicting a testing technique for a mobile network application in accordance to one embodiment.

FIG. 2 is an illustration of a method provided for testing a mobile network application according to one embodiment of the present invention. The method may be implemented on a mobile browser agent, which may be independent of a browser of a mobile device or a part of a browser of a mobile device. In this embodiment, a test request for a mobile network application is received from a client at step S210. The test request is used for testing the mobile network application on a browser of a mobile device.

The test request may comprise identification information for the client. In the presence of a plurality of clients, it is possible to identify which client the test request comes from. The client's identification information may be a physical identification of a client's machine operated by a user. In addition, the test request may further comprise action event information of an action event to be operated on the browser of the mobile device. The action event may be any action the user wants to perform on a page displayed on the browser, for example, opening a URL, clicking on a button on the page, etc. In addition, the test request may further comprise mobile device identification information for identifying the mobile device. As such, in the presence of a plurality of mobile devices, the user may specify which mobile device is used for tests.

At step S220, a test session window is activated on the browser of the mobile device according to the test request received from the client, wherein the test session window corresponds to the client. Accordingly, upon receipt of the test request from the client, the action event information contained in the test request may be interpreted first, for example, it is determined whether the action event is a synchronous event or an asynchronous event, etc. Then, the action event is triggered in the browser of the mobile device, so as to activate the corresponding test session window.

In instances where there already exists a test session window corresponding to the client, then the window is enabled to be in a currently active state on the browser. If there are no test session windows corresponding to the client, for example, the test request is a first test request for the application from the client, then a new test session window corresponding to the application of the client is generated on the browser of the mobile device. The identification information of the client sending the test request, the test session window information, and session information corresponding to the activated test session window may be all be stored. According to one embodiment of the present invention, the session information may be session identification information.

As shown, during step S230, an HTTP request corresponding to the test request is obtained, the HTTP request containing session information corresponding to the test session window. According to one embodiment of the present invention, the browser of the mobile device operates the action event contained in the test request in the activated test session window, generates a corresponding initial HTTP request and contains in the initial HTTP request the session information corresponding to the activated test session window, thereby an HTTP request corresponding to the test request is obtained. In this way, the HTTP request contains information corresponding to a test session window activated by a specific client, so that test requests from different clients are separated from each other.

Looking at step S240, the HTTP request corresponding to the test request is sent to an application server of the mobile network application. Subsequently, in step S250, an HTTP response of the application server to the HTTP request is received, the HTTP response containing session information of a corresponding test session window. In step S260, content displayed in response to the HTTP response in the test session window corresponding to the session information is sent to the client. Upon receiving the HTTP response, based on the session information contained in the HTTP response, the corresponding test session window is determined and activated, and the content is displayed in this window according to the HTTP response. Moreover, based on the correspondence between the test session window and the client and according to the test session window, the corresponding client is determined, and content displayed in the test session window in response to the HTTP response is sent to the determined corresponding client. By sending the displayed content to the client, the response of the tested mobile application to the requested action event may be easily obtained at the client.

According to one embodiment of the present invention, the content displayed on the browser of the mobile device may be saved in the form of screen copy and sent to the corresponding client based on the correspondence of the test session window with the client and the mobile network application tested on the client. In this way, by recording different session information for each test session window, a plurality of sessions may be separated from each other. In turn, a plurality of testers may test mobile network applications on the same mobile device in a multi-tenant way, so that the test cost may be reduced significantly and the test efficiency may be improved. In one example, session information corresponding to a session window may be stored in a cookie. A different cookie is stored for each test session window activated for each client. In this way, when an HTTP response is received from a server, a cookie corresponding to this window is updated and stored. When an operation is performed in the window again, a cookie contained in the HTTP request generated by the browser of the mobile device is replaced with the stored cookie corresponding to the window and then sent to the server.

Figure 3:
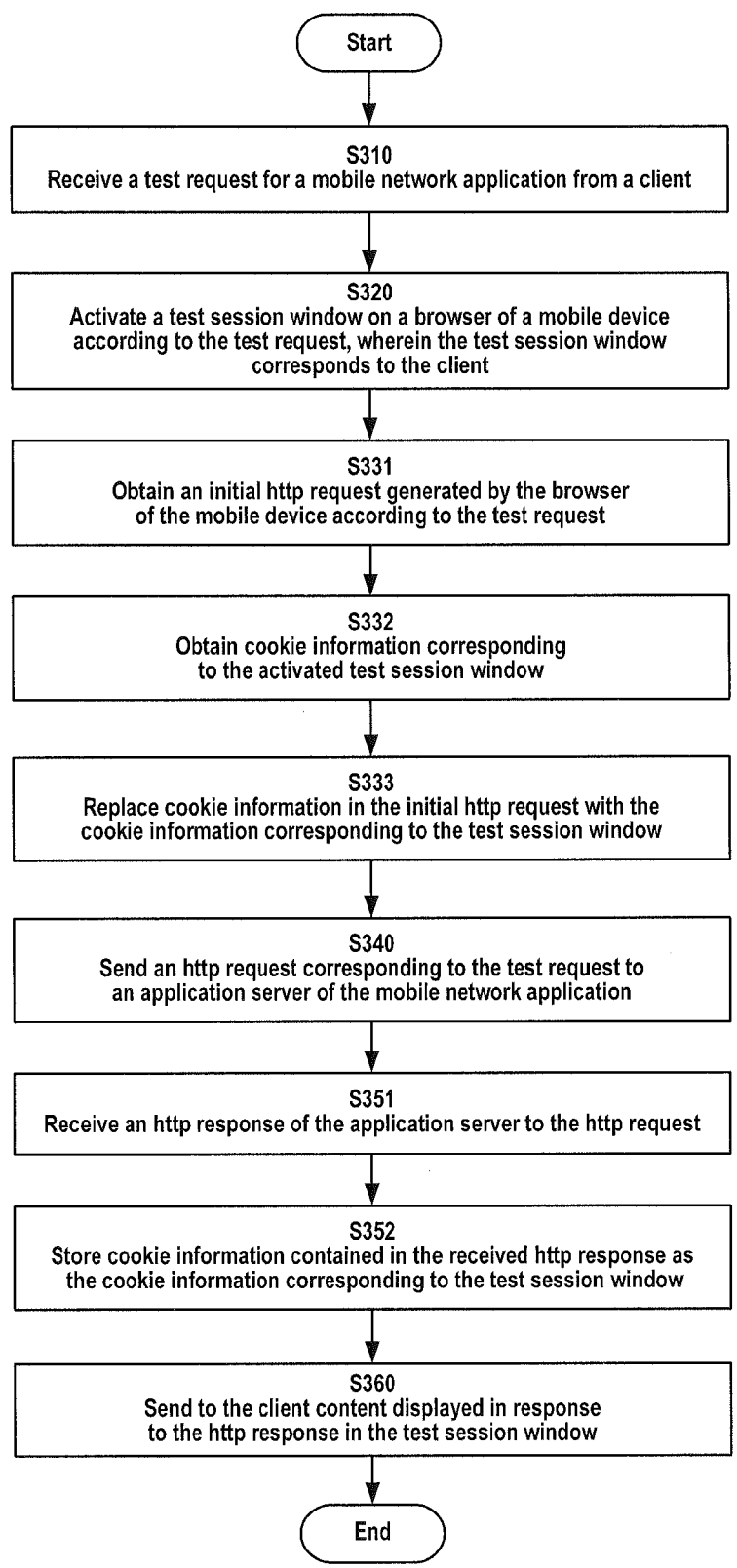
FIG. 3 is a flowchart illustration depicting a testing technique for a mobile network application according to an alternate embodiment.

FIG. 3 provides another embodiment illustrating a method for testing a mobile application. Steps S310 and S320 of FIG. 3 are the same as steps S210 and S220 in FIG. 2 respectively, and are thus not described in detail. In step S331, an initial HTTP request generated by the browser of the mobile device according to the test request is obtained, wherein the browser of the mobile device operates an action event contained in the test request in the activated test session window and generates a corresponding initial HTTP request.

In step S332, cookie information corresponding to the activated test session window is obtained, wherein the cookie is stored when the client accessed the application server via the mobile terminal browser last time. Each cookie corresponds to a different test session window of each client and contains session information of each test session window. In step S333, cookie information in the initial HTTP request is replaced with the cookie information corresponding to the test session window, so that an HTTP request corresponding to the test request is obtained. In step S340, the HTTP request is sent to the application server. In step S351, an HTTP response of the application server to the HTTP request is received, the HTTP response containing updated cookie information. Session information of the corresponding test session window is contained in the updated cookie information. In step S352, the cookie information contained in the received HTTP response is stored as cookie information corresponding to the test session window. Subsequently, in step S360, content displayed in the test session window in response to the HTTP response is sent to the client. Upon receipt of the HTTP response, the browser of the mobile terminal identifies the corresponding test session window by the session information contained in a cookie of the HTTP response and displays content in the window according to the HTTP response. By sending the displayed content to the client, the response of the tested mobile application to the requested action event may be easily obtained at the client.

The embodiment discussed involving the use of cookies is only provided as an example for providing clarity with the understanding that those skilled in the art may appreciate that any other alternatives may be used to store session information in correspondence to a test session window and deliver the session information between an application server and a mobile device. For example, in an HTML5 environment session information may be stored in correspondence to a test session window in a local storage of a mobile device. The action event in the embodiments of the present invention may comprise a synchronous event, for example, locally updating a page view at the mobile browser, and may also comprise an asynchronous event, such as XHR call ( ) Timeout ( ), Interval ( ) or reloading ( ) etc. Among them, XHR call ( ) refers to an asynchronous Ajax call, Timeout ( ) refers to calling a certain method after a given period of time, Interval ( ) refers to calling a certain method at regular intervals, and reloading ( ) refers to reloading a page. Those skilled in the art may appreciate that the various embodiments of the present invention may be further applied to other forms of synchronous or asynchronous events, which fall within the protection scope of the present invention. In addition, it should be pointed out that the present invention has been described above in the context of testing one mobile network application from one client, in which case the test session window corresponds to the client. However, those skilled in the art may appreciate that in the case of simultaneously testing a plurality of mobile network applications from one client, the test session window corresponds to not only the client but also a specific mobile network application in order to differentiate mobile network applications. In this way, a window is switched and activated via the correspondence of the window with the client and the mobile network application.

Furthermore, by way of example, description will be presented below to how to capture, trigger and monitor an action event. Tester A performs a test at mobile network test client A and generates an action event. For example, the tester A clicks on a button for page view updating. After capturing the event, client A generates a test request containing the action event, for example, an action event request, and sends the request to a mobile browser agent. For example, the action event request may be in the form below:

action-request::={client identifier, mobile device identifier, action-event}
action-event::={type, coordinate(pX, pY), target, [continuous-action-trace]}

Upon receipt of the action event request, the mobile browser agent interprets the action event, triggers the action event in a page of test window A corresponding to the action event request of a real browser of a mobile device, and generates an HTTP request to an application server of a mobile network application.

The mobile browser agent may further comprise an event monitor. A page, when loaded for the first time, is registered with the event monitor. For example,

```
monitor.connect(
    win.xhr | win.addEventListener | win.onLoad | ...,
        func(type/*touch|mouse/xhr/load*/){
            switch( ):
})
```

Through registration above, an event in the page window may be monitored and bounded to control logic. When a certain event in the page window is triggered, the control logic may capture the event and perform operations accordingly. Upon receipt of an HTTP response from the mobile application server, the event monitor will monitor the event till the end. When the event end is monitored, a window is switched and activated, and a screenshot of the current window is saved. Afterwards, the shot is sent back to the mobile network test client A.

According to one embodiment, the mobile browser agent may switch and activate an appropriate test session window under a group of customizable conditions. The customizable test session window activating condition may be, for example, one or more of: receipt of the arrival of a new test request, end of an ongoing action event in a test session window, completion of the processing in a current active test session window, and any other appropriate customized conditions, etc. By way of example, descriptions will be presented below to respective customized conditions according to the embodiment of the present invention. For instance, in Example 1, there are two active user windows, window 1 and window 2, on a current mobile device, and window 1 is now in an active state (the current active window); if a new request arrives at window 2 at this point, window 2 needs to be switched to the current active window, and corresponding subsequent actions need to be triggered. In Example 2, there are two active user windows, window 1 and window 2, on a current mobile device, and window 1 is now in an active state (the current active window); at this point, an HTTP response of window 2 arrives, then window 2 needs to switched to the current active window and the HTTP response needs to be displayed. In Example 3, there are two active user windows, window 1 and window 2, on a current mobile device, wherein window 1 is now in an active state (the current active window) and window 2 is in a wait state; at this point, all events in window 1 are completed (including a step of screen capturing), then window 2 needs to be switched to the current active window for processing. In Example 4, there are two active user windows, window 1 and window 2, on a current mobile device, and window 1 is now in an active state (the current active window) and window 2 is in a wait state; at this point a change of an event (data) in window 2 triggers the customized condition, for example, subarea A in window 2 is locally refreshed and a priority of this condition is higher than an ongoing step in window 1, then window 2 needs to be switched to the current active window or processing.

Although various possible window activation customized conditions have been displayed above by way of example, those skilled in the art may appreciate that any appropriate approaches may be used to activate and switch a window. In addition, a mechanism is provided to share a mobile device whereby a plurality of testers may be supported by one mobile device in a multi-tenant manner, and this procedure is transparent to each tester. Hence, the test cost may be reduced significantly and the test efficiency be improved. Compared with a simulator, the present invention provides more accurate test results, because a user may remotely work on a real mobile device other than on a simulator.

Figure 4:
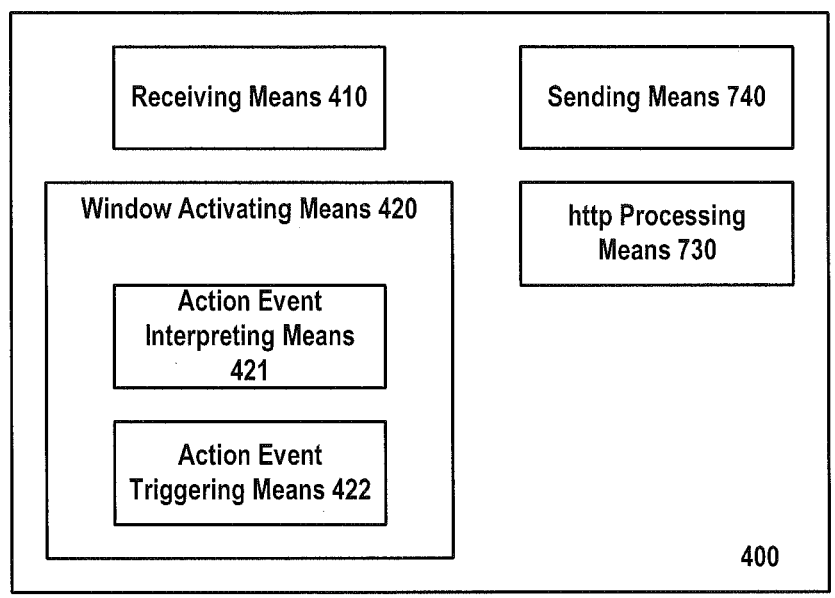
FIG. 4 is a flowchart illustration depicting a testing technique for a mobile network application according to yet another alternate embodiment.

Furthermore, a system for testing a mobile application is provided according to one embodiment of the present invention shown in FIG. 4, which includes receiving means 410 configured to receive a test request for a mobile network application from a client, in which the test request is used for testing the mobile network application on a browser of a mobile device. The system also includes window activating means 420 configured to activate a test session window on the browser of the mobile device according to the test request, wherein the test session window corresponds to the client; HTTP processing means 430 configured to obtain an HTTP request corresponding to the test request, wherein the HTTP request contains session information of the test session window. The HTTP request is sent correspondingly to an application server of the mobile network application. Subsequently the system can then receive an HTTP response from the application server (responding to the HTTP request). The HTTP response will contain session information of the test session window. In addition, sending means 440 is provided and configured to send to the client, content displayed in response to the HTTP response in the test session window that is corresponding to the session information.

In one embodiment, the test request may contain client identification information and action event information on an action event. The window activating means 420 may further comprise: action event interpreting means 421 configured to, in response to receiving the test request, interpret action event information contained in the test request; and action event triggering means 422 configured to trigger the action event in the browser of the mobile device so as to activate the test session window. The HTTP processing means 430 may further be configured to obtain an initial HTTP request generated by the browser of the mobile device according to the test request; and contain in the obtained initial HTTP request the session information corresponding to the activated test session window, so as to obtain the HTTP request corresponding to the test request. The window activating means 420 may further be configured to activate a corresponding test session window according to the session information contained in the HTTP response. The sending means 440 is further configured to determine a corresponding client according to the test session window, and send to the determined corresponding client the content displayed in response to the HTTP response in the test session window.

In one embodiment, the session information may be stored in a cookie (information) corresponding to the test session window such that the HTTP processing means 430 may further be configured to obtain an initial HTTP request generated by the browser of the mobile device according to the test request. The cookie information corresponding to the activated test session window and the cookie information containing session information of the test session window can both be obtained. This cookie information can be replaced in the initial HTTP request with the cookie information corresponding to the test session window so as to obtain the HTTP request corresponding to the test request.

In one embodiment, the receiving means 410 may further be configured to store cookie information contained in the received HTTP response as the cookie information corresponding to the test session window. The session information may further be stored in a local buffer. The test request may further include mobile device identification information for identifying a mobile device. The window activating means 420 may be configured to activate the test session window according to one or more of the following customized conditions: receipt of the arrival of a new test request, end of an ongoing action event in a test session window, completion of the processing in a current active test session window or any other appropriate customized conditions.

The flowchart and block diagrams in the figures in one embodiment illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for testing a mobile network application, comprising:
   receiving a test request for a mobile network application, the test request sent from a mobile network application of a client;
   activating a test session window on a browser of a mobile device according to the test request, the test session generated to correspond to the client mobile network application;
   obtaining a request in hypertext transfer protocol (HTTP) that corresponds to the test request such that the HTTP request contains session information for the test session window;
   sending the HTTP request to the mobile network application;
   receiving an HTTP response containing session information from the mobile network application; and
   sending to the client mobile network application content displayed in response to the HTTP response, wherein the HTTP displayed response is provided in the test session window based on the session information provided.

2. The method according to claim 1, wherein the test request contains client identification information and information relating to an action event.

3. The method according to claim 2, wherein activating a test session window on a browser of a mobile device further comprises:
   in response to receiving the test request, interpreting an action event information contained in the test request; and
   triggering the action event in the browser of the mobile device so as to activate the test session window.

4. The method according to claim 1, wherein obtaining a HTTP request corresponding to the test request further comprises:
   obtaining an initial HTTP request generated by the browser of the mobile device according to the test request; and
   containing in the obtained initial HTTP request, the session information corresponding to the activated test session window, so as to obtain an HTTP request corresponding to the test request.

5. The method according to claim 1, wherein sending to the client mobile network application content displayed in response to the HTTP response in the test session window corresponding to the session information further comprises:
   activating a corresponding test session window according to the session information contained in the HTTP response;
   determining a corresponding client according to the test session window; and
   sending to the determined corresponding client the content displayed in response to the HTTP response in the test session window.

6. The method according to claim 1, wherein the session information is stored in a cookie corresponding to the test session window; and wherein obtaining an HTTP request corresponding to the test request further comprises:
   obtaining an initial HTTP request generated by a browser of a mobile device in the mobile network according to the test request;
   obtaining cookie information corresponding to the activated test session window, the cookie information containing session information of the test session window; and
   replacing cookie information in the initial HTTP request with the cookie information corresponding to the test session window, so as to obtain an HTTP request corresponding to the test request.

7. The method according to claim 6, wherein receiving an HTTP response from the mobile application server further comprises: storing cookie information contained in the received HTTP response as the cookie information corresponding to the test session window.

8. The method according to claim 1, wherein the session information is stored in a local buffer and the test request further comprises mobile device identification information for identifying the mobile device.

9. The method according to claim 1, wherein a test session window is activated according to one or more customized conditions.

10. The method according to claim 9, wherein the customized conditions can include any of the following: receipt of the arrival of a new test request; end of an ongoing action event in a test session window; or completion of the processing in a current active test session window.

11. A system for testing a mobile network application, comprising:
   a receiver means configured to receive a test request for a mobile network application from a client;
   a window activator means configured to activate a test session window on a browser of a mobile device according to the test request, wherein the test session window corresponds to the mobile network application from the client;

hypertext markup language (HTTP) processing means configured to:

obtain an HTTP request corresponding to the test request, wherein the HTTP request contains session information of the test session window;

send the HTTP request corresponding to the test request to an application server of the mobile network application; and receive an HTTP response of the application server to the HTTP request, the HTTP response containing session information of the test session window; and sending means configured to send to the mobile network application from the client content displayed in response to the HTTP response in the test session window corresponding to the session information.

12. The system according to claim 11, wherein the test request contains client identification information and action event information on an action event.

13. The system according to claim 12, wherein the window activating means comprises:

action event interpreting means configured to, in response to receiving the test request, interpret the action event information contained in the test request; and action event triggering means configured to trigger the action event in the browser of the mobile device so as to activate the test session window.

14. The system according to claim 13, wherein the HTTP processing means is configured to obtain an initial HTTP request generated by the browser of the mobile device according to the test request.

15. The system according claim 11, wherein the window activating means is further configured to activate a corresponding test session window as per session information contained in the HTTP response.

16. The system according to claim 11 wherein the session information is stored in a cookie having information corresponding to the test session window.

17. The system according to claim 16, wherein the HTTP processing means is configured to obtain cookie information corresponding to the activated test session window having session information of the test session window, and to replace cookie information in the initial HTTP request with the cookie information corresponding to the test session window.

18. The system according to claims 11 wherein the session information is stored in a local buffer.

19. A computer program product for testing a mobile network application, the computer program product comprising a non-transitory computer readable storage medium having program code embodied therewith, the program code executable by a processor to:

receive a test request for a mobile network application, the test request sent from a mobile network application of a client;

activate a test session window on a browser of a mobile device according to the test request, the test session generated to correspond to the client mobile network application;

obtain a request in HTTP that corresponds to the test request such that the HTTP request contains session information for the test session window;

send the HTTP request to the mobile network application;

receive an HTTP response containing session information from the mobile network application; and sending to the client mobile network application content displayed in response to the HTTP response, wherein the HTTP displayed response is provided in the test session window based on the session information provided.

* * * * *